(12) United States Patent
Kurihara

(10) Patent No.: US 10,282,837 B2
(45) Date of Patent: May 7, 2019

(54) IMAGE MEASURING APPARATUS AND NON-TEMPORARY RECORDING MEDIUM ON WHICH CONTROL PROGRAM OF SAME APPARATUS IS RECORDED

(71) Applicant: MITUTOYO CORPORATION, Kawasaki, Kanagawa (JP)

(72) Inventor: Masaki Kurihara, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 169 days.

(21) Appl. No.: 15/250,052

(22) Filed: Aug. 29, 2016

(65) Prior Publication Data
US 2017/0061614 A1 Mar. 2, 2017

(30) Foreign Application Priority Data
Aug. 31, 2015 (JP) .................................. 2015-170614

(51) Int. Cl.
*G06T 7/00* (2017.01)
*G06K 9/46* (2006.01)
(Continued)

(52) U.S. Cl.
CPC .......... *G06T 7/0012* (2013.01); *G06K 9/4604* (2013.01); *G06K 9/4671* (2013.01); *G06K 9/6207* (2013.01); *G06T 7/60* (2013.01); *G06K 2009/4666* (2013.01); *G06T 2207/20112* (2013.01); *G06T 2207/20116* (2013.01); *G06T 2207/30164* (2013.01)

(58) Field of Classification Search
CPC ..... G06T 7/11; G06T 7/62; G06T 7/00; G06T 7/0012; G06T 7/0081; G06T 7/4671; G06T 7/0085; G06T 7/408; G06K 9/46; G06K 9/4604
See application file for complete search history.

(56) References Cited

U.S. PATENT DOCUMENTS 7,454,053 B2 * 11/2008 Bryll ..................... G06T 7/0004
382/152
7,693,563 B2 * 4/2010 Suresh ................ G06F 19/3481
600/407
(Continued)

FOREIGN PATENT DOCUMENTS

JP        06-139355       5/1994
JP        2001-241941     9/2001
(Continued)

*Primary Examiner* — Dramos Kalapodas
(74) *Attorney, Agent, or Firm* — Rankin, Hill & Clark LLP

(57) ABSTRACT

An image measuring apparatus according to an embodiment of the present invention comprises: an imaging device that images a workpiece to acquire an image of this workpiece; and a processing device that performs measurement of the workpiece based on this image and outputs a measurement result. Moreover, the processing device sets a region in the image, sets a plurality of first points along a contour line of this region, sequentially moves these plurality of first points so that the plurality of first points approximate to the contour line included in the image, acquires the moved plurality of first points as a plurality of second points, and calculates the measurement result based on these plurality of second points.

19 Claims, 9 Drawing Sheets

(51) Int. Cl.
    *G06T 7/60*          (2017.01)
    *G06K 9/62*         (2006.01)

(56) References Cited

U.S. PATENT DOCUMENTS

| | | | |
|---|---|---|---|
| 8,111,938 B2* | 2/2012 | Bryll | G02B 7/36 |
| | | | 382/255 |
| 2008/0021502 A1* | 1/2008 | Imielinska | A61B 6/032 |
| | | | 607/1 |
| 2009/0268159 A1* | 10/2009 | Xu | A61B 3/102 |
| | | | 351/206 |
| 2011/0161876 A1* | 6/2011 | Chang | G06T 7/13 |
| | | | 715/810 |
| 2012/0026316 A1* | 2/2012 | Nagahama | G01N 21/95607 |
| | | | 348/92 |
| 2012/0027289 A1* | 2/2012 | Naruse | G06T 7/001 |
| | | | 382/152 |
| 2012/0051606 A1* | 3/2012 | Saikia | G06T 7/13 |
| | | | 382/128 |
| 2017/0076446 A1* | 3/2017 | Pedersen | G06T 7/0012 |

FOREIGN PATENT DOCUMENTS

| | | |
|---|---|---|
| JP | 2002-049922 | 2/2002 |
| JP | 2004-239761 | 8/2004 |
| JP | 2011-076302 | 4/2011 |
| JP | 2012-194919 | 10/2012 |

\* cited by examiner

IMAGE MEASURING APPARATUS AND NON-TEMPORARY RECORDING MEDIUM ON WHICH CONTROL PROGRAM OF SAME APPARATUS IS RECORDED

CROSS-REFERENCE TO RELATED APPLICATIONS

This application is based upon and claims the benefit of Japanese Patent Application No. 2015-170614, filed on Aug. 31, 2015, the entire contents of which are incorporated herein by reference.

FIELD

The present invention relates to an image measuring apparatus that measures a workpiece by imaging the workpiece, and also relates to a non-temporary recording medium on which a control program of the image measuring apparatus is recorded.

BACKGROUND

Description of the Related Art

As a measuring apparatus for performing dimensional measurement or form measurement of a workpiece, that is, an object-to-be-measured, for example, an image measuring apparatus is known. The image measuring apparatus comprises: an imaging device that images the workpiece to acquire an image; and a processing device that performs image processing on this image and performs dimensional measurement or form measurement of the workpiece (JP 2001-241941 A).

For example, sometimes, when the image measuring apparatus was employed to perform dimensional measurement or form measurement of the workpiece, a portion representing a measurement target could not be appropriately extracted from within the image, and a measurement value could not be accurately acquired.

The present invention was made in view of such a point, and has an object of providing an image measuring apparatus capable of appropriately extracting a portion representing a measurement target from within an image and performing dimensional measurement or form measurement, and of providing a non-temporary recording medium on which a control program of the image measuring apparatus is recorded.

DETAILED DESCRIPTION

Figure 1:
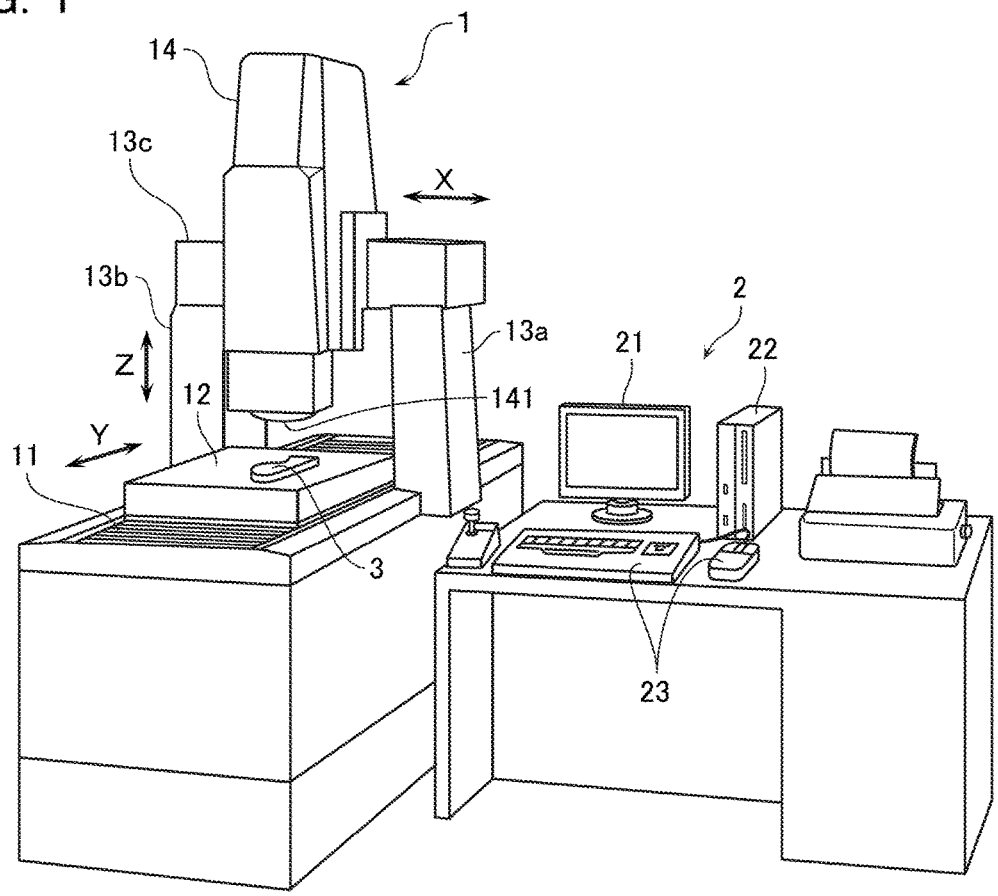
FIG. 1 is a general view of an image measuring apparatus according to a first embodiment of the present invention.

In order to solve the above-mentioned problem, an image measuring apparatus according to an embodiment of the present invention comprises: an imaging device that images a workpiece to acquire an image; and a processing device that performs measurement of the workpiece based on this image and outputs a measurement result. Moreover, the processing device sets a region in the image, sets a plurality of first points along a contour line of this region, sequentially moves these plurality of first points so that the plurality of first points approximate to the contour line included in the image, acquires the moved plurality of first points as a plurality of second points, and calculates the measurement result based on these plurality of second points.

In such an embodiment, a technique of a so-called active contour model is adopted in processing performed when extracting a portion representing a measurement target from within an image. That is, a region is set in the acquired image, a plurality of first points are set along a contour line of this region, and these plurality of first points are sequentially moved so that the plurality of first points approximate to the contour line included in the image. Therefore, if the measurement target can be surrounded by the plurality of first points, it is possible to appropriately extract the portion representing the measurement target from within the image and perform dimensional measurement or form measurement, even if, for example, a size, angle, tone, position, and so on, of the measurement target are different from those assumed.

For example, the processing device may acquire a condition relating to the region and the plurality of first points at a stage of teaching, and at a stage of automatic measurement, perform measurement according to this condition. In addition, the processing device may set an edge detection tool in the image based on the second point, and perform edge detection using the edge detection tool. Moreover, the processing device may calculate a first contour line based on the second point, set a plurality of line segments each extending in a direction intersecting this first contour line, along this first contour line, and perform edge detection along these line segments.

A computer-readable non-temporary recording medium according to an embodiment of the present invention records a control program of an image measuring apparatus. The image measuring apparatus comprises: an imaging device that images a workpiece to acquire an image of the workpiece; and a processing device that performs measurement of the workpiece based on this image and outputs a measurement result. The control program controls the image measuring apparatus to perform calculation of the measurement result. Moreover, by this program, the processing device sets a region in the image, sets a plurality of first points along a contour line of this region, sequentially moves these plurality of first points so that the plurality of first points approximate to a contour line included in the image, acquires the moved plurality of first points as a plurality of second points, and calculates the measurement result based on these plurality of second points.

The present invention makes it possible to provide an image measuring apparatus capable of preferably performing dimensional measurement or form measurement, and to provide a non-temporary recording medium on which a control program of the image measuring apparatus is recorded.

[First Embodiment]

Next, a first embodiment of the present invention will be described in detail with reference to the drawings.

First, a schematic configuration of an image measuring apparatus according to the present embodiment will be described with reference to FIG. 1.

As shown in FIG. 1, the image measuring apparatus according to the present embodiment comprises: an image measuring instrument 1 that comprises mutually orthogonal X, Y, and Z axes, and has a camera 141 mounted as an imaging device that images a workpiece 3, at an extremity of this Z axis; and a computer (hereafter, called "PC") 2 connected to this image measuring instrument 1.

The image measuring instrument 1 is configured as follows. That is, a workstage 12 is mounted on a sample moving means 11, so that an upper surface of the workstage 12 acting as a base plane coincides with a horizontal plane, and an X axis guide 13c is supported by upper ends of arm support bodies 13a and 13b erected from edges on both sides of the sample moving means 11. The workstage 12 is driven in a Y axis direction by the sample moving means 11. An imaging unit 14 is supported drivably in an X axis direction, in the X axis guide 13c. The camera 141 is mounted drivably in a Z axis direction, at a lower end of the imaging unit 14.

Note that the present embodiment adopts a system where the workpiece 3 disposed on the workstage 12 is imaged, but another system is of course possible, for example, a system of the kind where a workpiece disposed on a floor is imaged from a lateral direction, is possible. Moreover, various kinds of cameras such as CCD and CMOS are usable as the camera 141.

The PC 2 comprises: a processing device 22; and a display device 21 and input device 23 that are connected to this processing device 22. The processing device 22 comprises internally a CPU and a storage device such as a hard disk or the like. The display device 21 is the likes of a display or projector, for example. The input device 23 is an operation input device into which an operation of a measurer is inputted, and is, for example, a mouse, a keyboard, a touch panel, or the like.

Next, a picture displayed on a screen of the display device 21 will be described with reference to FIG. 2.

Figure 2:
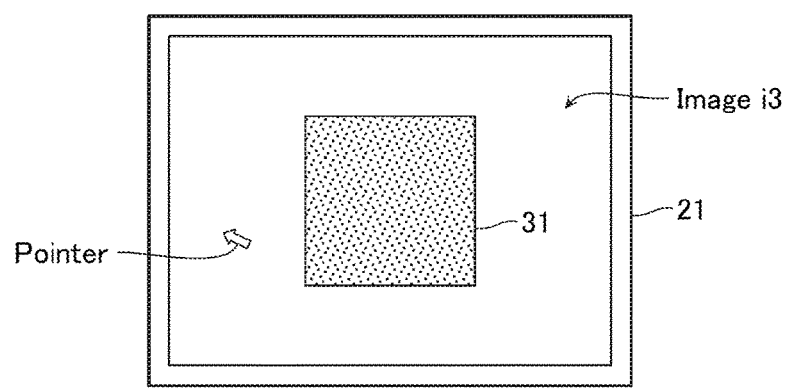
FIG. 2 shows a display screen displaying an image of a workpiece in the same image measuring apparatus.

As shown in FIG. 2, an image of the workpiece 3 acquired by the camera 141 (hereafter, notated as image i3 in the drawings) is displayed on the screen of the display device 21. In the example shown in FIG. 2, the workpiece 3 includes a measurement target 31. Moreover, a pointer operated by the input device (mouse, and so on) 23 is displayed on the screen of the display device 21.

Next, a configuration of the processing device 22 according to the present embodiment will be described in more detail with reference to FIG. 3.

Figure 3:
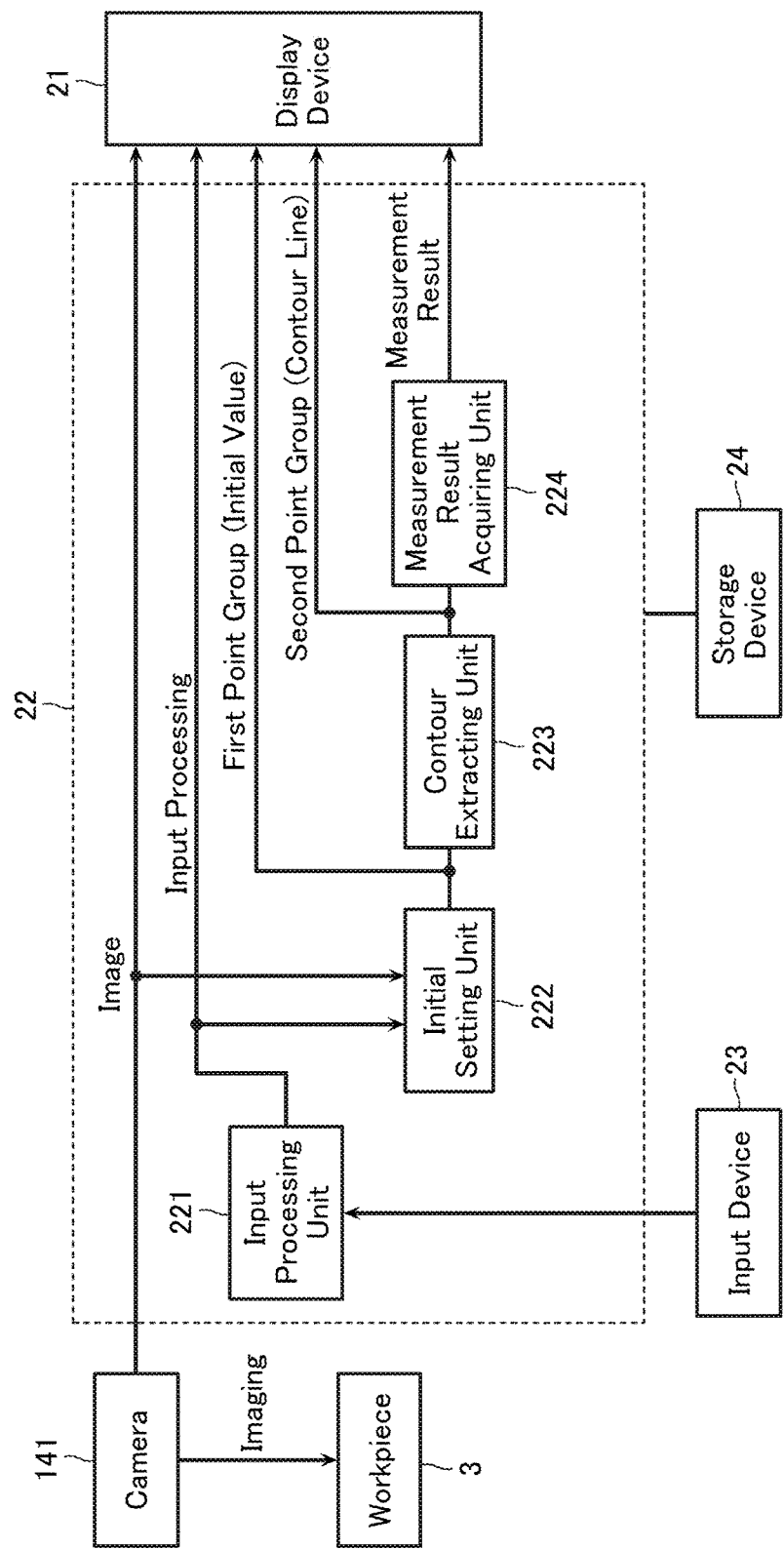
FIG. 3 is a block diagram showing a configuration of the same image measuring apparatus.

As shown in FIG. 3, in the image measuring apparatus according to the present embodiment, the camera 141 images the workpiece 3 and acquires an image of the workpiece 3. Moreover, this image is transferred to the display device 21 via the processing device 22. Moreover, the processing device 22 receives an operation of the measurer via input of the input device 23, and performs measurement (for example, dimensional measurement or form measurement, and so on) of the workpiece 3 based on this. For example, the processing device 22 extracts a portion representing a measurement target from within the image by analyzing the image, performs the likes of dimensional measurement or form measurement for this measurement target, and calculates a value related to position such as a centroid, or a value related to form such as a contour line, width, and so on.

Note that extraction of the portion representing the measurement target can be performed by a variety of modes, but in the first embodiment, is performed by a method adopting a technique of a so-called active contour model. That is, a first point group including a plurality of first points is set so as to surround the measurement target 31 (refer to FIG. 6), and these plurality of first points are moved so as to approximate to a contour line of the measurement target 31, thereby acquiring a plurality of second points (a second point group) (refer to FIGS. 7 and 8).

Figure 6:
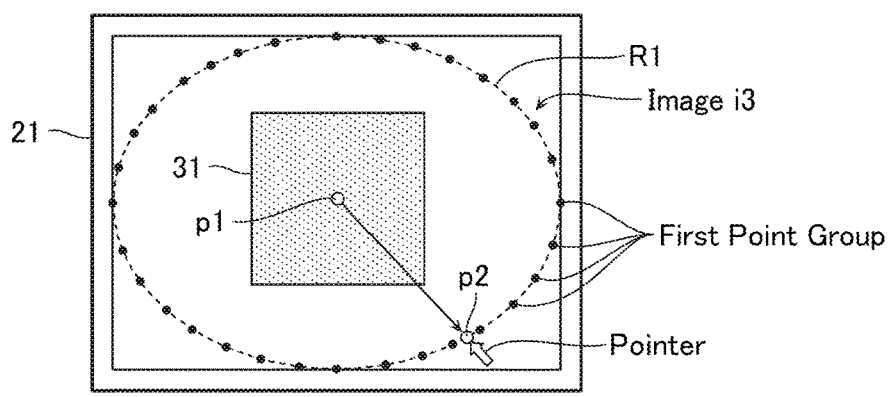
FIG. 6 shows a display screen after initial setting in the same method.
Figure 7:
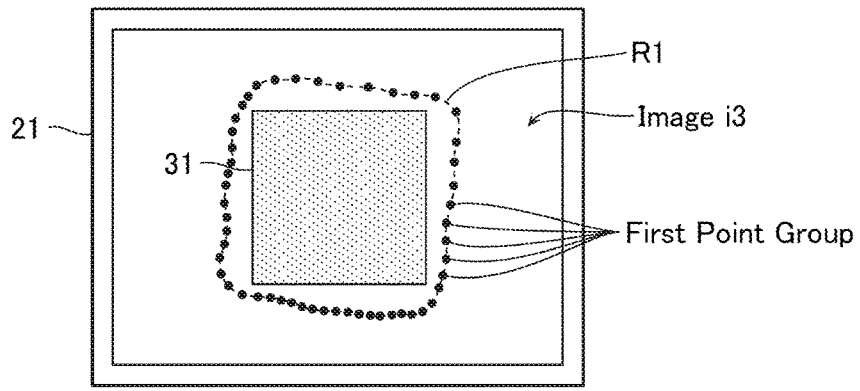
FIG. 7 shows a display screen during extraction of a contour of a measurement target in the same method.

As shown in FIG. 3, the processing device 22 achieves a function described below by a CPU, a memory and a program stored in the likes of a hard disk (storage device 24). That is, an input processing unit 221 receives an operation of the measurer via input from the input device 23, and, based on this, performs the likes of calculation of a position of the pointer (refer to FIG. 2) displayed in the display device 21. An initial setting unit 222 performs an initial setting required in measurement of the workpiece 3. For example, as shown in FIG. 6, the initial setting unit 222 sets the first point group including the plurality of first points. A contour extracting unit 223 extracts a contour line of the measurement target 31. For example, as shown in FIG. 7, the contour extracting unit 223 sequentially moves the plurality of first points so that the plurality of first points approximate to the contour line of the measurement target 31, and acquires the moved plurality of first points as the plurality of second points. A measurement result acquiring unit 224 acquires the measurement result, based on the plurality of second points (the second point group) acquired in the contour extracting unit 223.

Next, operation of the image measuring apparatus according to the present embodiment will be described with reference to FIGS. 4 to 9.

Figure 4:
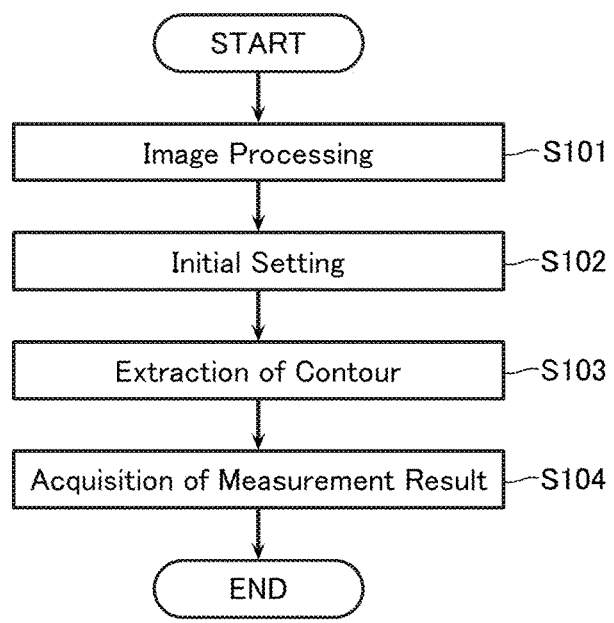
FIG. 4 is a flowchart showing a method of measuring by the same image measuring apparatus.
Figure 5:
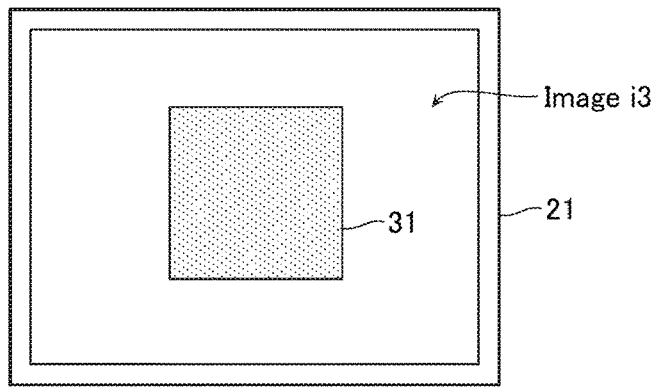
FIG. 5 shows a display screen after image processing in the same method.

As shown in FIGS. 4 and 5, in step S101, image processing is performed on the image acquired by the camera 141. The image processing may be performed in a variety of modes, but, for example, contrast in the image can be emphasized by a method such as binarization. Moreover, for example, in the image processing, it is also possible to perform various kinds of filtering, and so on, and reduce noise in the image. Note that the image processing may also be omitted.

As shown in FIGS. 4 and 6, in step S102, initial setting required in measurement of the workpiece 3 is performed. For example, as shown in FIG. 6, a region R1 is set in the image acquired by the camera 141, based on an input operation. In the example shown in FIG. 6, the region R1 is set so as to surround the measurement target 31. In addition, the first point group including the plurality of first points is set along a contour line of this region R1.

The region R1 can be set by a variety of methods. In the example shown in FIG. 6, the region R1 is set so as to surround the measurement target 31. For example, as shown in FIG. 6, by clicking a point p1 which is close to the center of the measurement target 31, a central position of the region R1 can be specified, and then, by dynamically changing an outer edge of the region R1 following movement of the pointer and performing an operation such as clicking on the point p2, the outer edge of the region R1 can be specified. Moreover, the region R1 can also be specified by surrounding the measurement target 31 making a locus of the pointer be the outer edge of the region R1, for example. Moreover, the region R1 can also be specified by a tool having a fixed size and form. Moreover, a form of the region R1 may be any form, such as a circle, an ellipse, a square, a rectangle, or another polygon.

The first point group can be set by a variety of methods. For example, after the region R1 has been set, the number of points of the first point group can be adjusted according to a length of the contour line of the region R1. Moreover, the number of points of the first point group can also be determined beforehand. Moreover, the first point group may be aligned at equal intervals along the contour of the region R1, or may be configured not at equal intervals.

Moreover, it is also possible that, for example, in such cases as when teaching is utilized to perform automatic measurement, in a stage of teaching, the region R1 and the first point group are set according to the above-mentioned kind of condition, for example, and in a stage of automatic measurement, the region R1 and the first point group are set by a similar condition to this condition.

Figure 8:
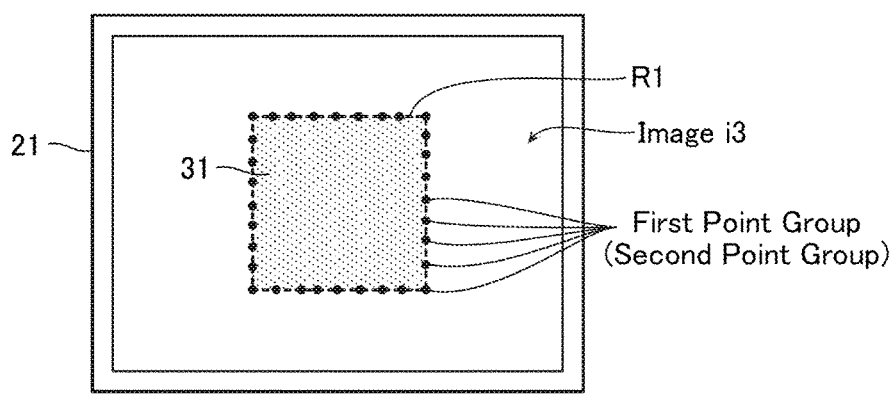
FIG. 8 shows a display screen after extraction of a contour of a measurement target in the same method.

As shown in FIGS. 4, 7, and 8, in step S103, the plurality of first points set in step S102 are sequentially moved. The first point group is moved so as to approximate to the contour line in the image acquired by the camera 141 (for example, the contour line of the measurement target 31). Moreover, as shown in FIG. 8, in step S103, the moved plurality of first points are acquired as the plurality of second points (the second point group).

The plurality of first points can be moved by a variety of methods. For example, an evaluation function that takes into consideration the length (interval between fellow first points) and smoothness of the contour line of the region R1, or a distance between the first point and the measurement target 31, and so on, can be set, and the plurality of first points can be gradually moved so that this evaluation function approximates to an optimum value. For example, such an evaluation function can be more closely approximated to the optimum value, the shorter the interval between fellow first points is, and the smoother the contour line of the region R1 is. As a result, as shown in FIG. 7, the plurality of first points gradually move toward the inside of the region R1. Moreover, the above-described evaluation function may include a term that indicates a gradient of density in the image, and that approximates the above-described evaluation function to the optimum value when a change (gradient) of color (density, tone) is large. As a result, as shown in FIG. 8, it is possible that, at a timing when the first point has reached the contour of the measurement target 31, movement of the first point is stopped and the first point is moved onto the contour line of the measurement target 31.

Figure 9:
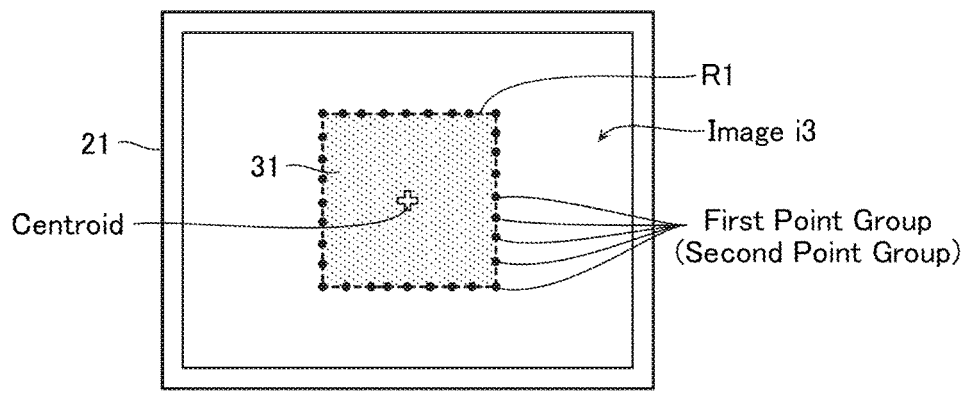
FIG. 9 shows a display screen after acquisition of a centroid of a measurement target in the same method.

As shown in FIGS. 4 and 9, in step S104, a result of measurement is acquired based on the plurality of second points acquired in step S103. In step S104, a variety of values, such as a centroid or a contour line, a width, and so on, of the measurement target, can be calculated.

The centroid of the measurement target can be calculated by a variety of methods. For example, the centroid of the measurement target can be calculated by calculating a centroid of the plurality of second points. In this case, for example, in step S103, intervals between fellow second points can be aligned at equal intervals along the contour line of the measurement target 31. In addition, for example, the centroid of the measurement target may also be calculated by calculating a centroid of the region R1 specified by the plurality of second points. Moreover, it is also possible that, for example, before calculating the centroid of the measurement target, the contour line of the measurement target is calculated beforehand, and the centroid is calculated based on this contour line. Moreover, it is also possible to perform fitting of a form such as a circle or polygon to the second point, and calculate the centroid based on that result.

The contour line of the measurement target may be calculated by a variety of methods. For example, a straight line or curve passing through the plurality of second points may be adopted as the contour line of the measurement target. Moreover, it is also possible to calculate the width, and so on, of the measurement target, based on the contour line acquired in this way.

Moreover, in step S104, some of the plurality of second points can be thinned before calculating the measurement result such as the centroid or contour line. During thinning, for example, it is conceivable to exclude those of the plurality of second points that are a certain distance or more from the measurement target, or to employ the likes of abnormal point removal processing using a least squares method, and so on.

Now, in a conventional image measuring apparatus, sometimes, processings such as edge detection, pattern recognition, and labeling were performed on an image acquired by a camera, whereby a portion representing a measurement target was extracted from within the image, and dimensional measurement or form measurement were performed.

Figure 10:
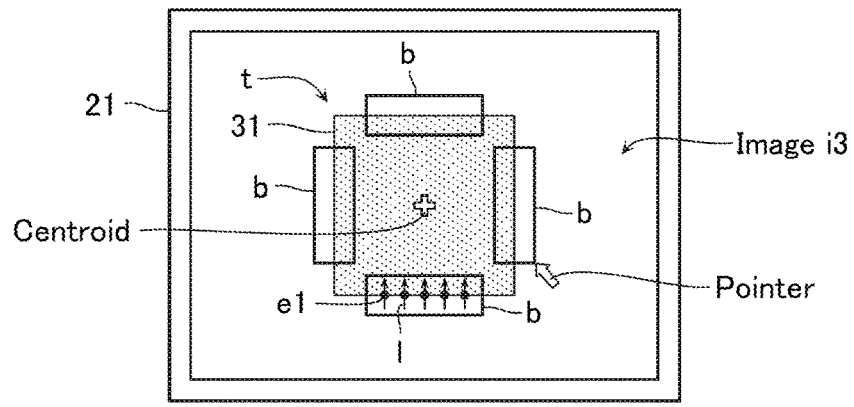
FIG. 10 shows a display screen when performing edge detection by a conventional image measuring apparatus.

For example, sometimes, as shown in FIG. 10, when dimensional measurement or form measurement was performed by edge detection, an edge detection-dedicated tool t having a fixed form was used. The edge detection-dedicated tool t exemplified in FIG. 10 includes four boxes b, and each box b has a rectangular form extending along a supposed contour of the measurement target 31. Moreover, in each box b, a plurality of line segments l each extending in a transverse direction of the box b are provided along a longitudinal direction of the box b. In the edge detection, as shown in FIG. 10, each box b was superimposed on the contour of the measurement target 31, and a pixel having a largest change (gradient) of color (density, tone) along the line segment l in the box b was acquired as an edge point el. Moreover, a straight line or curve passing through these plurality of edge points el was assumed to be the contour line of the measurement target 31. Furthermore, the centroid of the measurement target 31 was calculated based on the contour line acquired in this way.

Figure 11:
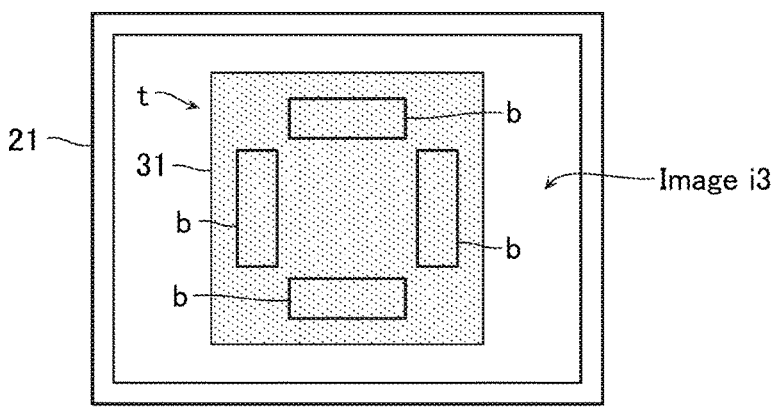
FIG. 11 shows a display screen when performing the same edge detection.
Figure 12:
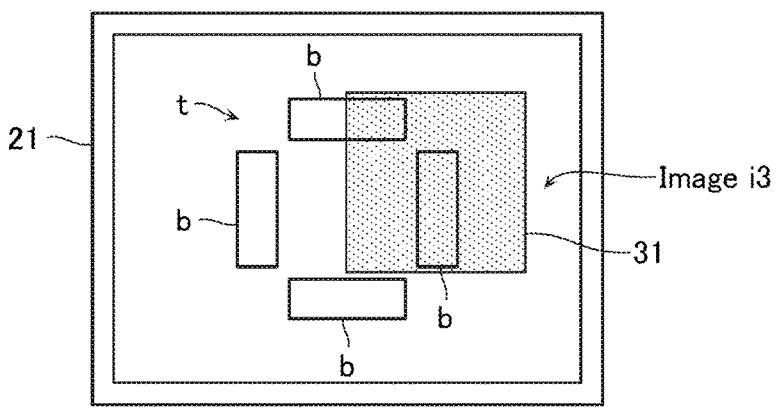
FIG. 12 shows a display screen when performing the same edge detection.

In such a mode, a positional relationship of the box b in the tool t is fixed. Therefore, sometimes, in such cases as when, for example, as shown in FIG. 11, a size of the measurement target 31 differed from a supposed size, or when, as shown in FIG. 12, a position of the tool t ended up being misaligned from the measurement target 31, each of the boxes b could not be superimposed on the contour of the measurement target 31, and the portion representing the measurement target could not be appropriately extracted from within the image.

Figure 13:
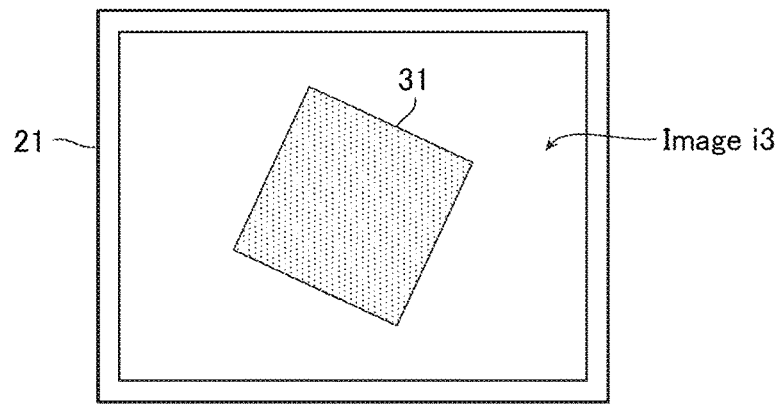
FIG. 13 shows a display screen when performing pattern recognition by a conventional image measuring apparatus.
Figure 14:
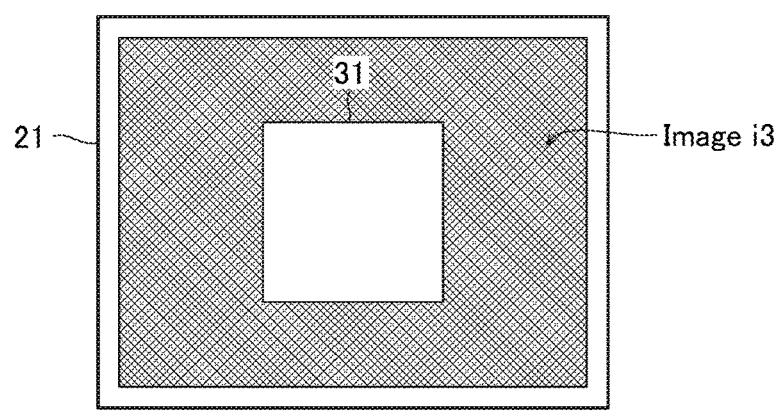
FIG. 14 shows a display screen when performing the same pattern recognition.

Moreover, when, for example, dimensional measurement or form measurement was performed by pattern recognition, the centroid of the measurement target 31 was calculated by preparing an image representing a sample beforehand, and, on the basis of this image, retrieving the measurement target 31 from within the image. In such a mode, sometimes, in such cases as when, for example, as shown in FIG. 13, the measurement target 31 was tilted, or when, as shown in FIG. 14, tone of the image was different, the measurement target 31 could not be retrieved and the portion representing the measurement target could not be appropriately extracted, from within the image.

Moreover, when, for example, dimensional measurement or form measurement was performed by labeling, the image acquired by the camera 141 was binarized, and portions where pixels of the same color were continuous in an up-down direction or left-right direction were each assumed to be identical regions. Moreover, these regions were each assigned with different numbers, and a position of a centroid or contour line, and so on, was calculated for each of these regions.

Figure 15:
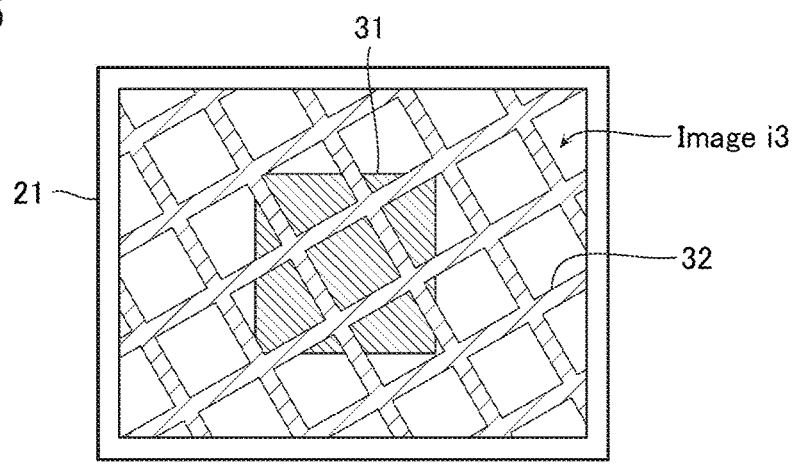
FIG. 15 shows a display screen when performing labeling by a conventional image measuring apparatus.
Figure 16:
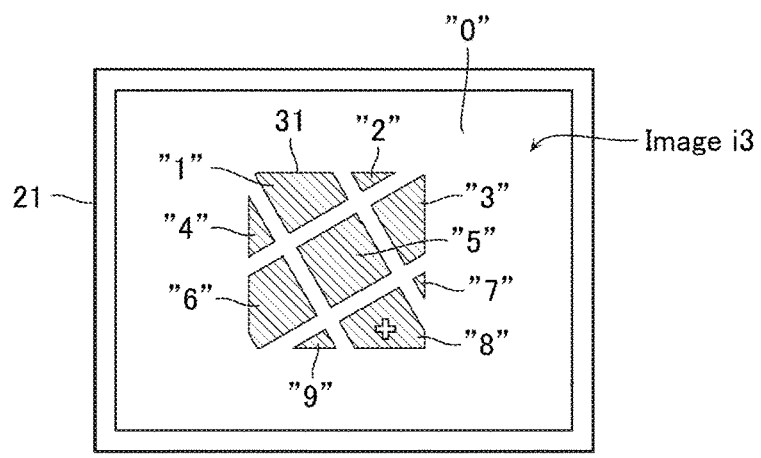
FIG. 16 shows a display screen when performing the same labeling.

In such a mode, sometimes, in such cases as when, for example, as shown in FIG. 15, a different pattern 32 was superimposed on the measurement target 31, the portion representing the measurement target could not be appropriately extracted from within the image. That is, sometimes, when, as shown in FIG. 15, a different pattern 32 was superimposed on the measurement target 31, then, as shown in FIG. 16, at a time point when the image was binarized, the measurement target 31 was divided into a plurality of portions, and these plurality of portions ended up being assigned with different numbers. For example, sometimes, when it was attempted to calculate the position of the centroid in such a case, as shown in FIG. 16, the position of the centroid for one of the divided regions ended up being calculated, and the centroid position of the measurement target 31 could not be preferably calculated. Note that FIG. 16 exemplifies the case where the centroid for the region assigned with the number "8" ended up being calculated.

Figure 17:
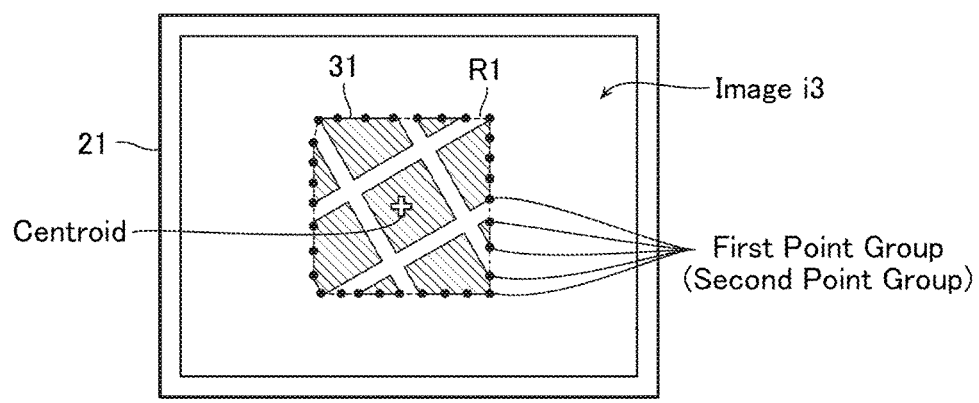
FIG. 17 shows a display screen showing an example of the method of measuring by the image measuring apparatus according to the first embodiment of the present invention.

To counter such cases, in the first embodiment, the plurality of first points are set so as to surround the measurement target 31 (refer to FIG. 6), these plurality of first points are moved so as to approximate to the contour line of the measurement target 31, whereby the plurality of second points are acquired (refer to FIGS. 7 and 8), and measurement of the likes of dimensional measurement or form measurement is performed based on these plurality of second points (refer to FIG. 9). Therefore, if the measurement target 31 can be surrounded by the plurality of first points, then, even in such cases as when the size of the measurement target 31 is different from that supposed (refer to FIG. 11), when the measurement target 31 is tilted (refer to FIG. 13), or when the tone of the image is different (refer to FIG. 14), the portion representing the measurement target can be appropriately extracted from within the image, and measurement such as dimensional measurement or form measurement can be performed. Moreover, in the case where the measurement target 31 is surrounded by the plurality of first points, measurement can be performed by a rougher alignment than the case where the above-described box b is superimposed on the contour of the measurement target 31, hence it is easier to suppress the problem of positional misalignment like that mentioned above than in the case of employing the tool t like that shown in FIG. 12. Moreover, even when, for example, the measurement target 31 has ended up being divided into a plurality of portions by binarization as explained with reference to FIG. 16, surrounding these plurality of portions by the plurality of first points as shown in FIG. 17 makes it possible to appropriately extract the portion representing the measurement target from within the image, and perform measurement.

Figure 18:
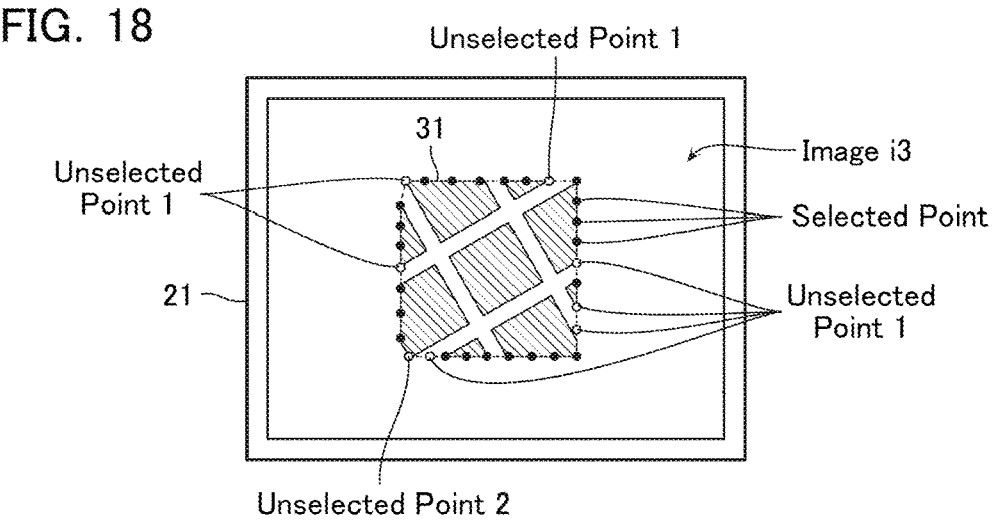
FIG. 18 shows a display screen after performing thinning in a second point group, in the same method.
Figure 19:
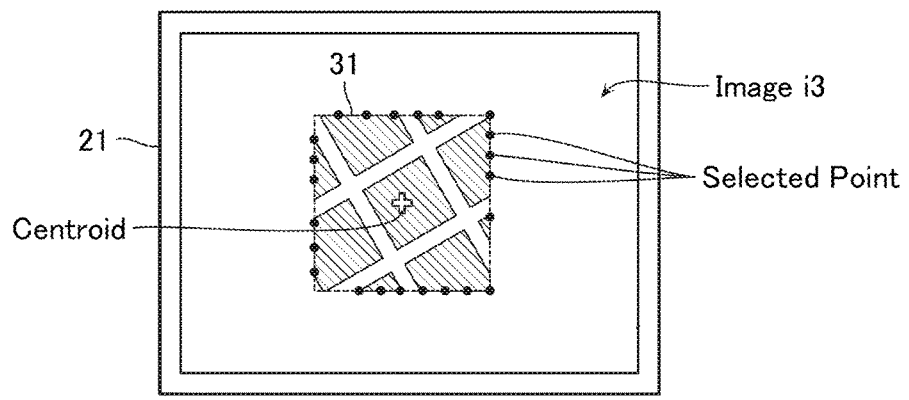
FIG. 19 shows a display screen in the case that fitting of a form has been performed in a selected second point group, in the same method.

Moreover, in such cases as when, for example, the measurement target 31 has ended up being divided into a plurality of portions as explained with reference to FIG. 16, more highly accurate measurement can be performed by thinning some of the plurality of second points. For example, in the example shown in FIG. 18, a plurality of unselected points 1 that are a certain distance or more from the measurement target 31 are excluded. Moreover, in the example shown in FIG. 18, an unselected point 2 is excluded by abnormal point removal processing using a least squares method, and so on. This makes it possible to detect the contour line of the measurement target 31 based on selected points of the plurality of second points. Moreover, as shown in FIG. 19, performing fitting of a form such as a circle or polygon to these selected points makes it possible to detect the centroid of the measurement target 31.

[Second Embodiment]

Next, an image measuring apparatus according to a second embodiment of the present invention will be described with reference to FIG. 20. Note that in the description below, portions similar to those of the first embodiment will be assigned with identical reference symbols to those assigned in the first embodiment, and descriptions thereof will be omitted.

The image measuring apparatus according to the present embodiment is basically configured similarly to that of the first embodiment, but differs from that of the first embodiment in the following point. That is, in the present embodiment, after the likes of the centroid or contour line of the measurement target have been calculated based on the second point group in step S104, edge detection is further performed. The edge detection can be performed in a variety of modes, but in the example shown in FIG. 20, an edge detection tool t is set in the measurement target 31 based on the calculated centroid or contour line, and this edge detection tool t is employed to perform measurement.

The edge detection tool t can be set by a variety of methods. For example, a form of the edge detection tool t can be selected from the contour line calculated based on the second point group. For example, it is also possible to use as the edge detection tool t an edge detection tool having another form, such as a circular shaped one, other than the square shaped one of the kind shown in FIG. 20. Moreover, for example, a distance between fellow boxes b or a size of the box b, an angle, and so on, in the edge detection tool t can also be adjusted from the contour line calculated based on the second point group.

Figure 20:
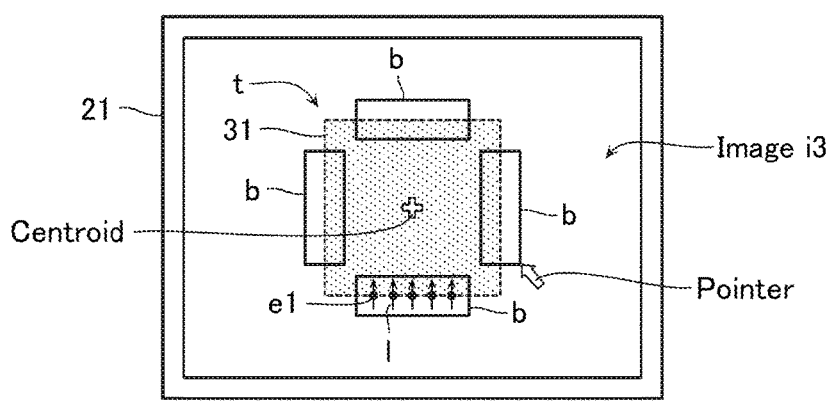
FIG. 20 shows a display screen displaying an edge detection tool in a method of measuring by an image measuring apparatus according to a second embodiment of the present invention.

Measurement employing the edge detection tool t can be performed in a variety of modes, but, as shown in FIG. 20, it is possible that in each box b, a plurality of line segments 1 each extending in a transverse direction of the box b are set at equal intervals along a longitudinal direction of the box b, a pixel having a largest change (gradient) of color (density, tone) is acquired as an edge point el along these plurality of line segments 1, and this is adopted as the contour line of the measurement target 31. Moreover, the centroid of the measurement target 31 can also be calculated based on the contour line acquired in this way.

Note that the edge detection can also be performed by an edge trace, without using the edge detection tool t of the kind shown in FIG. 20, for example. In such a case, it is also possible that, for example, on the contour line calculated based on the second point group, a plurality of line segments each extending in a direction intersecting this contour line are set at equal intervals along the contour line, an edge point is acquired along these plurality of line segments, and this is adopted as the contour line of the measurement target 31.

In the present embodiment, the centroid or contour line, and so on, of the measurement target are calculated in step S104 similarly to in the first embodiment. Therefore, similarly to in the first embodiment, the portion representing the measurement target can be appropriately extracted from within the image. Moreover, in the present embodiment, edge detection is performed at this extracted measurement place, hence measurement can be performed more preferably.

For example, in the present embodiment, it is possible that after the contour line has been calculated based on the second point group, an edge point group is acquired at even finer intervals, hence the contour line of the measurement target 31 can be measured in more detail. Moreover, when, for example, a plurality of measurement targets having different sizes are measured, even if intervals between fellow second points end up varying according to the sizes of the measurement targets, intervals of sampling can be aligned to be constant.

In addition, as mentioned above, in the present embodiment, it is also possible for the form of the edge detection tool t to be selected from the contour line calculated based on the second point group, or for the edge trace to be performed. This makes it possible to perform precise measurement on a plurality of measurement targets having different shapes or sizes, and makes it possible to achieve labor saving of teaching or flexible measurement, and so on.

[Third Embodiment]

Figure 21:
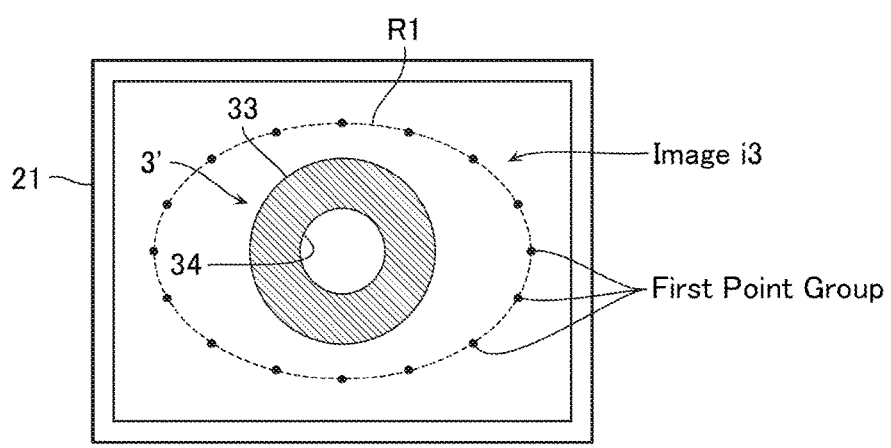
FIG. 21 shows a display screen after initial setting in a method of measuring by an image measuring apparatus according to a third embodiment of the present invention.
Figure 22:
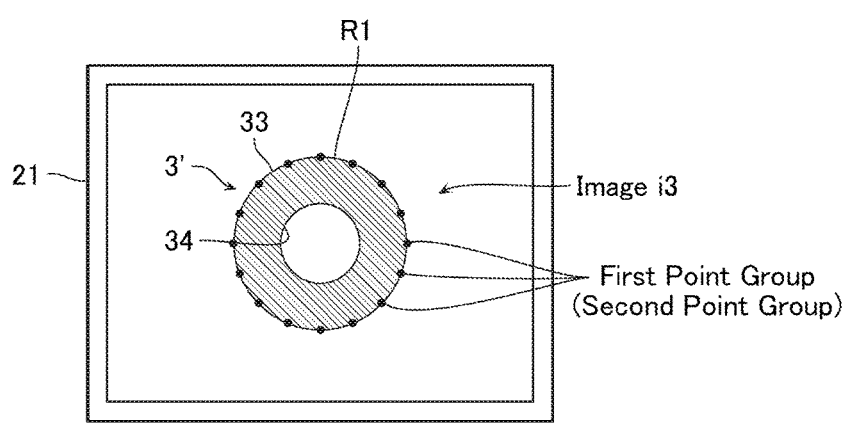
FIG. 22 shows a display screen after extraction of a contour of a measurement target 33 in the same method.
Figure 23:
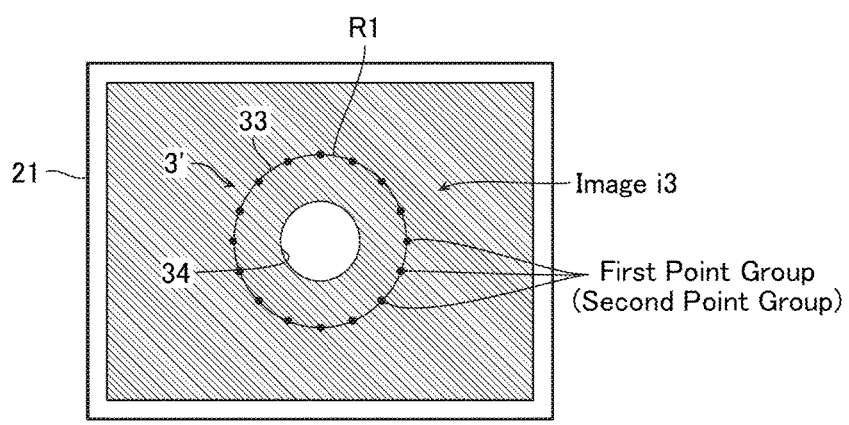
FIG. 23 shows a display screen after image processing in the same method.

Next, an image measuring apparatus according to a third embodiment of the present invention will be described with reference to FIGS. 21 to 23. Note that in the description below, portions similar to those of the first embodiment will be assigned with identical reference symbols to those assigned in the first embodiment, and descriptions thereof will be omitted.

The image measuring apparatus according to the present embodiment is basically configured similarly to that of the first embodiment, but differs from that of the first embodiment in the following point. That is, in the present embodiment, as shown in FIG. 21, the binarized image has the plurality of first points set therein so as to surround a measurement target 33, and, as shown in FIG. 22, these plurality of first points are moved to acquire the second point group aligned along the contour of the measurement target 33. Moreover, as shown in FIG. 23, the outside of the contour of the measurement target 33 is filled in in the same color (density, tone) as the inside of the contour of the measurement target 33, and the plurality of first points are moved again, thereby acquiring a point group aligned along a contour of a through hole 34 positioned on the inside of the contour of the measurement target 33. Moreover, the likes of a centroid, contour line, and width of the through hole 34 (another measurement result) are calculated based on this point group.

[Other Embodiments]

The present invention, in addition to being able to be applied in the case of using the three-dimensional image measuring instrument in which the camera 141 is configured to be drivable in the Z axis direction and which is capable of measuring a coordinate in the Z axis direction, may be applied also in the case of using a two-dimensional image measuring instrument or a microscope having an image measuring function.

What is claimed is:

1. An image measuring apparatus, comprising:
   an imaging device that images a workpiece to acquire an image of the workpiece; and
   a processing device that extracts a portion representing a measurement target of the workpiece from within the image by analyzing the image, performs measurement of the workpiece based on the analyzed image and outputs a measurement result,
   wherein the processing device analyzes the image by:
   setting a region in the image, and setting a plurality of positional information of first points along a contour line of this region;
   setting an evaluation function regarding the plurality of positional information of the first points such that the evaluation function approximates to an optimum value as intervals between the first points adjacent to each other decrease and a gradient of density around the first points in the image increases; and
   sequentially changing the plurality of positional information of the first points so that the evaluation function approaches the optimum value, stopping changing the plurality of positional information of the first points at a timing when the evaluation function reaches the optimum value and acquiring the changed plurality of positional information of the first points as a plurality of positional information of second points, and
   the processing device performs measurement of the workpiece by:
   setting an edge detection tool in the image based on the plurality of positional information of second points; and
   performing edge detection using the edge detection tool and detecting the result of the edge detection as the measurement result.

2. The image measuring apparatus according to claim 1, wherein
   the processing device
   at a stage of teaching, acquires a condition relating to the region and acquires the plurality of positional information of first points, and
   at a stage of automatic measurement, sets the plurality of positional information of first points acquired at the stage of teaching and performs measurement according to the condition.

3. The image measuring apparatus according to claim 1, wherein
the edge detection tool includes a plurality of line segments set at equal intervals, and
the processing device acquires a plurality of edge points along the plurality of line segments.

4. An image measuring apparatus, comprising:
an imaging device that images a workpiece to acquire an image of the workpiece; and
a processing device that extracts a portion representing a measurement target of the workpiece from within the image by analyzing the image, performs measurement of the workpiece based on the analyzed image and outputs a measurement result,
wherein the processing device analyzes the image by:
setting a region in the image, and setting a plurality of positional information of first points along a first contour line of this region;
setting an evaluation function regarding the plurality of positional information of the first points such that the evaluation function approximates to an optimum value as intervals between the first points adjacent to each other decrease and a gradient of density around the first points in the image increases; and
sequentially changing the plurality of positional information of the first points so that the evaluation function approaches the optimum value, stopping changing the plurality of positional information of the first points at a timing when the evaluation function reaches the optimum value and acquiring the changed plurality of positional information of the first points as a plurality of positional information of second points, and
the processing device performs measurement of the workpiece by:
setting a second contour line in the image based on the plurality of positional information of second points;
setting a plurality of line segments each extending in a direction intersecting the second contour line, along the second contour line; and
performing edge detection along the line segments and detecting the result of the edge detection as the measurement result.

5. The image measuring apparatus according to claim 4, wherein
the processing device
at a stage of teaching, acquires a condition relating to the region and acquires the plurality of positional information of first points, and
at a stage of automatic measurement, sets the plurality of positional information of first points acquired at the stage of teaching and performs measurement according to the condition.

6. The image measuring apparatus according to claim 1, wherein
the workpiece comprises a through hole positioned inside of a contour line of the workpiece, and
the processing device, after having acquired the plurality of positional information of the second points,
fills an outside of a region surrounded by the plurality of second points with a same color, density or tone as a color, density or tone of the workpiece,
further changes the plurality of positional information of the second points so that the evaluation function approaches the optimum value, and calculates another measurement result based on the changed plurality of positional information of the second points.

7. A non-transitory recording medium which is computer-readable and has recorded thereon a control program of an image measuring apparatus,
the image measuring apparatus comprising:
an imaging device that images a workpiece to acquire an image of the workpiece; and
a processing device that extracts a portion representing a measurement target of the workpiece from within the image by analyzing the image, performs measurement of the workpiece based on the analyzed image and outputs a measurement result,
the control program of the image measuring apparatus controlling the image measuring apparatus to perform calculation of the measurement result,
wherein the control program, by the processing device, analyzes the image by:
setting a region in the image, and setting a plurality of positional information of first points along a contour line of this region;
setting an evaluation function regarding the plurality of positional information of the first points such that the evaluation function approximates to an optimum value as intervals between the first points adjacent to each other decrease and a gradient of density around the first points in the image increases; and
sequentially changing the plurality of positional information of the first points so that the evaluation function approaches the optimum value, stopping changing the plurality of positional information of the first points at a timing when the evaluation function reaches the optimum value and acquiring the changed plurality of positional information of the first points as a plurality of positional information of second points, and
the control program, by the processing device, performs measurement of the workpiece by:
setting an edge detection tool in the image based on the plurality of positional information of second points; and
performing edge detection using the edge detection tool and detecting the result of the edge detection as the measurement result.

8. The non-transitory recording medium according to claim 7, wherein
the program, by the processing device,
at a stage of teaching, acquires a condition relating to the region and acquires the plurality of positional information of first points, and
at a stage of automatic measurement, sets the plurality of positional information of first points acquired at the stage of teaching and performs measurement according to the condition.

9. The non-transitory recording medium according to claim 7, wherein
the edge detection tool includes a plurality of line segments set at equal intervals, and
the processing device acquires a plurality of edge points along the plurality of line segments.

10. The non-transitory recording medium according to claim 7, wherein
the workpiece comprises a through hole positioned inside of a contour line of the workpiece, and
the processing device, after having acquired the plurality of positional information of the second points, fills an outside of a region surrounded by the plurality of second points with a same color, density or tone as a color, density or tone of the workpiece, further changes the plurality of positional information of the second points so that the evaluation function approaches the optimum value, and calculates another measurement result based on the changed plurality of positional information of the second points.

11. The image measuring apparatus according to claim 2, wherein at the stage of automatic measurement, the positional information of first points is set in the image in spite of information included in the image.

12. The image measuring apparatus according to claim 1, wherein a form of the edge detection tool is selected based on the plurality of positional information of second points.

13. The image measuring apparatus according to claim 1, wherein the edge detection tool includes a plurality of boxes, each of the boxes includes a plurality of line segments, the processing device acquires a plurality of edge points along the plurality of line segments, and a distance between one and another of the plurality of boxes is adjusted based on the plurality of positional information of second points.

14. The image measuring apparatus according to claim 5, wherein at the stage of automatic measurement, the positional information of first points is set in the image in spite of information included in the image.

15. The image measuring apparatus according to claim 4, wherein a form of the edge detection tool is selected based on the plurality of positional information of second points.

16. The image measuring apparatus according to claim 4, wherein the edge detection tool includes a plurality of boxes, each of the boxes includes a plurality of line segments, the processing device acquires a plurality of edge points along the plurality of line segments, and a distance between one and another of the plurality of boxes is adjusted based on the plurality of positional information of second points.

17. The non-transitory recording medium according to claim 8, wherein at the stage of automatic measurement, the positional information of first points is set in the image in spite of information included in the image.

18. The non-transitory recording medium according to claim 7, wherein a form of the edge detection tool is selected based on the plurality of positional information of second points.

19. The non-transitory recording medium according to claim 7, wherein the edge detection tool includes a plurality of boxes, each of the boxes includes a plurality of line segments, the processing device acquires a plurality of edge points along the plurality of line segments, and a distance between one and another of the plurality of boxes is adjusted based on the plurality of positional information of second points.

* * * * *